United States Patent
LaTulippe et al.

(10) Patent No.: US 9,863,565 B2
(45) Date of Patent: Jan. 9, 2018

(54) MULTI-LAYER EXPANDABLE HOSE

(71) Applicant: TEKNOR APEX COMPANY, Pawtucket, RI (US)

(72) Inventors: Chris LaTulippe, Fitchburg, MA (US); Kevin Cai, Cumberland, RI (US); Ron Eilertson, Mansfield, MA (US); Timothy L. Chapman, Stanton, TN (US); Steve Correa, Brownsville, TN (US); Michael Melo, North Dartmouth, MA (US); Paul Burke, Essex, VT (US); Darnell C. Worley, II, Uxbridge, MA (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 191 days.

(21) Appl. No.: 14/944,905

(22) Filed: Nov. 18, 2015

(65) Prior Publication Data
US 2016/0146379 A1    May 26, 2016

Related U.S. Application Data (60) Provisional application No. 62/084,108, filed on Nov. 25, 2014.

(51) Int. Cl.
*F16L 9/00* (2006.01)
*F16L 11/00* (2006.01)
(Continued)

(52) U.S. Cl.
CPC ............. *F16L 33/20* (2013.01); *B32B 1/08* (2013.01); *B32B 3/28* (2013.01); *B32B 5/02* (2013.01);
(Continued)

(58) Field of Classification Search
CPC .. F16L 11/04; F16L 33/20; B32B 5/02; B32B 5/022
(Continued)

(56) References Cited

U.S. PATENT DOCUMENTS 1,104,508 A   7/1914   Huthsing
5,381,834 A   1/1995   King
(Continued)

FOREIGN PATENT DOCUMENTS

GB   904638   8/1962
GB   1017331   1/1966
(Continued)

OTHER PUBLICATIONS

Search Report dated Jan. 27, 2016.

*Primary Examiner* — Vishal Pancholi
(74) *Attorney, Agent, or Firm* — Hudak, Shunk & Farine Co. LPA (57) ABSTRACT

An expandable hose assembly that is able to expand one or more of longitudinally along the length-wise axis of the hose between hose ends and radially, to an expanded state in response to application of at least a minimum fluid pressure to an inner tube of the hose. Once the fluid pressure falls below the minimum fluid pressure, the hose will contract. The hose includes a thermoplastic elastomer inner layer and a slip coating layer thereon having lubricating properties that increases the life of the hose assembly. The hose assembly can include an outer sheath or covering that covers the inner tube and slip coating layer.

18 Claims, 5 Drawing Sheets

(51) Int. Cl.

| | |
|---|---|
| *F16L 33/20* | (2006.01) |
| *F16L 11/12* | (2006.01) |
| *B32B 5/02* | (2006.01) |
| *B32B 7/02* | (2006.01) |
| *B32B 7/04* | (2006.01) |
| *B32B 25/04* | (2006.01) |
| *B32B 25/08* | (2006.01) |
| *B32B 25/10* | (2006.01) |
| *B32B 27/12* | (2006.01) |
| *B32B 27/18* | (2006.01) |
| *B32B 27/20* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 1/08* | (2006.01) |
| *B32B 3/28* | (2006.01) |
| *F16L 11/10* | (2006.01) |

(52) U.S. Cl.
CPC ............ *B32B 5/022* (2013.01); *B32B 5/024* (2013.01); *B32B 7/02* (2013.01); *B32B 7/045* (2013.01); *B32B 25/042* (2013.01); *B32B 25/08* (2013.01); *B32B 25/10* (2013.01); *B32B 27/12* (2013.01); *B32B 27/18* (2013.01); *B32B 27/20* (2013.01); *B32B 27/283* (2013.01); *B32B 27/304* (2013.01); *B32B 27/32* (2013.01); *B32B 27/322* (2013.01); *B32B 27/34* (2013.01); *B32B 27/36* (2013.01); *F16L 11/12* (2013.01); *B32B 2262/0253* (2013.01); *B32B 2262/0261* (2013.01); *B32B 2262/0276* (2013.01); *B32B 2274/00* (2013.01); *B32B 2307/51* (2013.01); *B32B 2307/536* (2013.01); *B32B 2307/554* (2013.01); *B32B 2307/71* (2013.01); *B32B 2597/00* (2013.01); *F16L 11/10* (2013.01)

(58) Field of Classification Search
USPC .......................... 138/109, 119; 149/109, 119
See application file for complete search history.

(56) References Cited

U.S. PATENT DOCUMENTS

| | | | |
|---|---|---|---|
| 5,385,173 | A | 1/1995 | Gargiulo |
| 5,816,622 | A | 10/1998 | Carter |
| 5,901,754 | A | 5/1999 | Elsasser et al. |
| 6,113,153 | A | 9/2000 | Yang |
| 6,447,835 | B1 | 9/2002 | Wang et al. |
| 6,948,527 | B2 | 9/2005 | Ragner et al. |
| 7,108,018 | B1 | 9/2006 | Mezzalira |
| 7,168,451 | B1 | 1/2007 | Dundas |
| 7,549,448 | B2 | 6/2009 | Ragner et al. |
| 8,291,941 | B1 | 10/2012 | Berardi |
| 8,291,942 | B2 | 10/2012 | Berardi |
| 8,371,143 | B2 | 2/2013 | Ragner |
| 8,479,776 | B2 | 7/2013 | Berardi |
| 8,757,213 | B2 | 6/2014 | Berardi |
| 8,776,836 | B2 | 7/2014 | Ragner et al. |
| 8,936,046 | B2 | 1/2015 | Ragner |
| D722,681 | S | 2/2015 | Berardi |
| D723,669 | S | 3/2015 | Berardi |
| D724,186 | S | 3/2015 | Berardi |
| 9,022,076 | B2 | 5/2015 | Ragner et al. |
| 2013/0113205 | A1 | 5/2013 | Berardi |
| 2014/0130930 | A1 | 5/2014 | Ragner |
| 2014/0150889 | A1 | 6/2014 | Ragner |
| 2014/0345734 | A1 | 11/2014 | Berardi |
| 2015/0007902 | A1 | 1/2015 | Ragner |
| 2015/0041016 | A1 | 2/2015 | Ragner |
| 2015/0129042 | A1 | 5/2015 | Ragner |

FOREIGN PATENT DOCUMENTS

| | | |
|---|---|---|
| WO | 2014169057 A1 | 10/2014 |
| WO | 2015023592 A1 | 2/2015 |

MULTI-LAYER EXPANDABLE HOSE

FIELD OF THE INVENTION

The present invention relates to an expandable hose assembly that is able to expand one or more of longitudinally along the length-wise axis of the hose between hose ends and radially, to an expanded state in response to application of at least a minimum fluid pressure to an inner tube of the hose. Once the fluid pressure falls below the minimum fluid pressure, the hose will contract. The hose includes a thermoplastic elastomer inner layer and a slip coating layer thereon having lubricating properties that increases the life of the hose assembly. The hose assembly can include an outer sheath or covering that covers the inner tube and slip coating layer.

BACKGROUND OF THE INVENTION

Hoses that expand under fluid pressure longitudinally along their length multiple times as compared to the length of the hose in an unpressurized or contracted state are popular for various reasons including, but not limited to, light weight construction and ease of storage when not in use.

Such hoses are commercially available from a number of sources. The hoses are also described in various patents and publications, see for example: U.S. Pat. Nos. 6,948,527; 7,549,448; 8,371,143; 8,776,836; 8,291,942; 8,479,776; 8,757,213; as well as U.S. Patent Application Publication Nos. 2014/0150889; and 2014/0130930.

U.S. Patent Application Publication No. 2015/0007902 relates to a retractable pressure hose which comprises an inlet connector, an outlet connector, an inner elastic tube, an outer cover, and a lubricant disposed to reduce chafing between the inner elastic tube and the outer cover. In such a hose, the lubricant can comprise a solid lubricant such as paraffin wax or other slippery solids, a liquid lubricant such as olive oil or other slippery liquids, or a combination of solid and/or liquid lubricants.

A problem with some of the length expandable hoses is that they can kink, bulge, fail and/or exhibit leakage, at one or more points along their length, for example at a connection point to a coupler or fitting at the end of the hose, after a number of expansion and contraction cycles.

Still another problem of the present invention is the need for a hose assembly having a hose-to-coupler connection exhibiting desirable bite-through or cut resistance, as some hoses in the art have been known to fail when the hose end is attached to the coupler.

SUMMARY OF THE INVENTION

The problems described above and others are solved by the hose assemblies of the present invention, which include a longitudinally and/or radially expandable hose or tube comprising an elastomeric inner layer and a relatively rigid outer slip coating layer directly thereon including a lubricant, wherein the construction has unexpectedly been found to increase the cycle life of the hose assembly even though the rigid outer slip coating layer can break or fracture after the first expansion of the inner layer.

According to one objective or embodiment of the present invention, a hose assembly is disclosed comprising a flexible hose that can expand along the longitudinal axis of the hose as well as undergo a radial expansion, wherein the hose expands from a contracted or non-expanded state or position to an expanded state or position when pressure at or above a minimum fluid pressure is applied to the hose, more specifically, to the inner tube of the assembly. When the fluid pressure falls below the minimum fluid pressure, the inner tube of the hose will contract.

A further object or embodiment of the present invention is to provide a hose assembly including a flexible hose that expands to an expanded position that is at least two times the length of the hose in a contracted position.

Yet another object or embodiment of the present invention is to provide a hose assembly comprising a hose having an elastomeric inner tube and a relatively rigid outer slip coating layer on the tube, wherein the hose assembly is durable enough to withstand at least 500, 1000 and preferably 1500 expansion cycles. An expansion cycle is herein defined as performing an expansion on the inner tube of a hose assembly, including the inner tube with slip coating layer thereon, an outer covering, and couplers at each end of the hose assembly, by applying fluid pressure, such as liquid, e.g. water and/or a gas, e.g. air, that ranges from 40-65 psi (pounds per square inch) (275.8-448.2 kPa) to an inner surface of the inner tube such that the inner tube expands one or more of radially and longitudinally measured at ambient pressure, when the fluid pressure is applied for 1 to 4 seconds and thereafter the inner tube of the hose assembly is allowed to contract one or more of radially and longitudinally to a contracted position by reducing fluid pressure to ambient atmospheric pressure. The rate of expansion cycles is set in such a manner to allow a minimal amount of time between expansion cycles, and ranges from 1-4 seconds.

An additional object or embodiment of the present invention is to provide a hose assembly that includes an outer covering that can be elastic or non-elastic and protects the flexible elastic inner tube and slip coating layer from contact with the ambient environment.

Still a further object or embodiment of the present invention is to provide a hose assembly having a sleeve or strain relief located at least at one end of the flexible hose, adjacent to a coupler, and extending a longitudinal distance along the length of the hose from the coupler, wherein the sleeve increases the life of the hose and aids in one or more of bite resistance and preventing bending stress at the hose end wherein the hose is connected to a coupler of the hose, such as a male or female coupler. For hoses using a compression type fitting with a flare nut and ferrule, it may be more desirable to have the sleeve under the outer sheath or covering. For hoses using internally expanded fittings, it may be more desirable to have the sleeve outside of the outer sheath or covering.

Yet another object or embodiment of the present invention is to provide a hose assembly including a flexible hose having an elastomeric inner tube having a radial thickness that is greater at one end of the hose as compared to at least one adjacent segment located further away from the end of the hose. In one embodiment, the inner tube thickness at the end of the hose is graduated and decreases in thickness in a direction away from the end of the inner tube. The inner tube can also be foamed (closed cell) to further reduce the weight.

Another object or embodiment of the present invention is to provide a hose assembly that is kink and bulge resistant upon one or more of expansion and contraction.

Yet another object or embodiment of the present invention is to provide a hose assembly that meets the needs of both consumer and commercial users. The inner tube is formulated to provide improved puncture resistance or toughness in the case where the outer tube, sheath or covering has failed to protect the inner tube from hazards.

Still a further object or embodiment of the present invention is to provide a hose assembly with a slip coating layer on the flexible elastic inner tube that greatly facilitates assembly of the finished product in cases where the manufacturer inserts the inner tube manually or automatically into the outer sheath or covering.

An important further object or embodiment is to increase the durability of an expandable hose assembly.

In one aspect, an embodiment of a hose assembly is described, comprising an inner tube comprising an elastomeric material; and an outer slip coating layer directly contacting the inner tube and comprising a blend of a lubricant and a carrier material, preferably comprising a polymer, wherein the inner tube has one or more of a) a first length in a longitudinal direction in a contracted position below a minimum expansion pressure and a second length longer than the first length and b) a first radius in the contracted position below the minimum expansion pressure and a second radius larger than the first radius, when fluid pressure on an interior of the inner tube is at or above the minimum expansion pressure.

In another aspect, an embodiment of a hose assembly is described comprising an inner tube comprising an elastomeric material that is expandable in length and/or expandable radially to achieve an increase in tube diameter; a slip coating layer present on an outer surface of the inner tube, the slip coating layer comprising a blend of a lubricant and a carrier material, preferably comprising a polymer; the slip coating layer continuously or discontinuously covering the inner tube in both contracted and expanded states, wherein the inner tube having the slip coating layer thereon is located within an outer covering.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

The hose assembly of the present invention includes an inner tube that can expand one or more of a) between tube ends along the longitudinal length of the hose and b) radially, to an expanded position or state in response to at least a minimum fluid pressure applied internally to the inner tube. The inner tube contracts when fluid pressure inside the tube falls below the minimum fluid pressure to a contracted position or state. A relatively rigid outer slip coating layer is located on the outer surface of the inner tube, even though the coating may not be continuous due to breakage or fracture after the first expansion of the inner tube, and unexpectedly increases the durability of the hose assembly as evidenced by an increase in the number of expansion and contraction cycles the hose assembly can withstand before failure as compared to a hose assembly without the slip coating layer. The hose assembly also unexpectedly exhibits increased bite-through resistance at the area of connection of the inner tube to a coupler.

Figure 1:
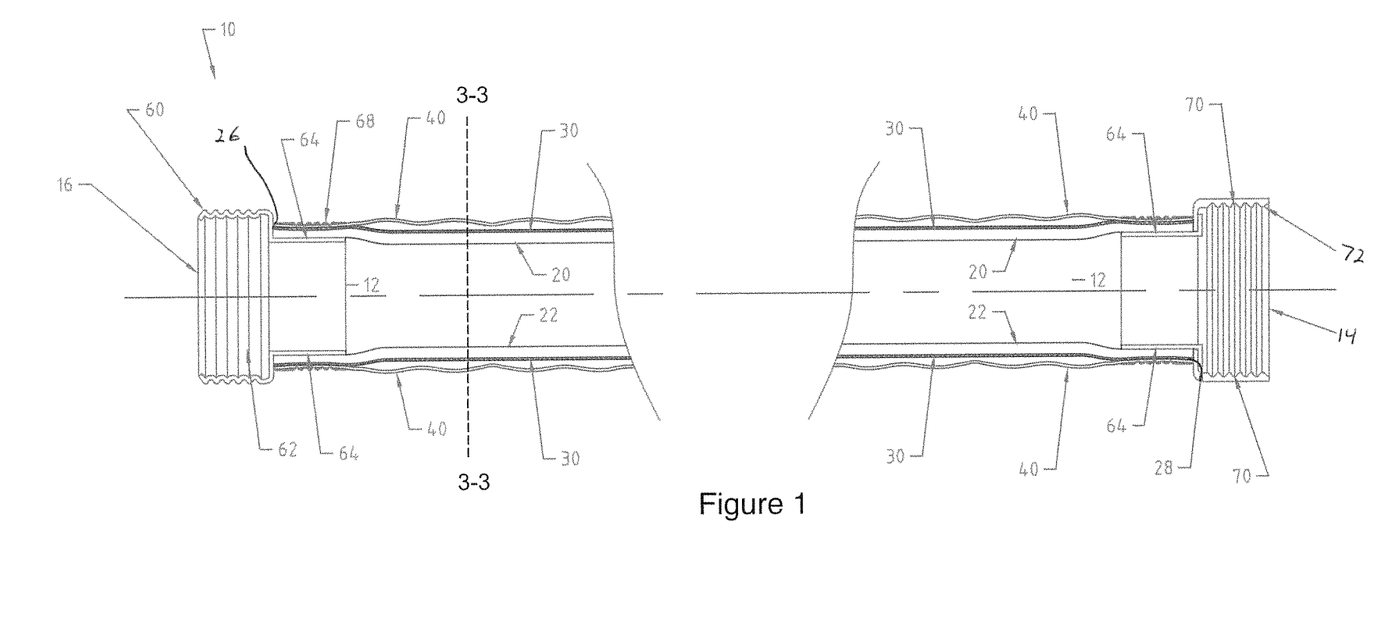
FIG. 1 is a partial, cross-sectional, longitudinal side view of one embodiment of a hose assembly of the present invention in a contracted position.
Figure 2:
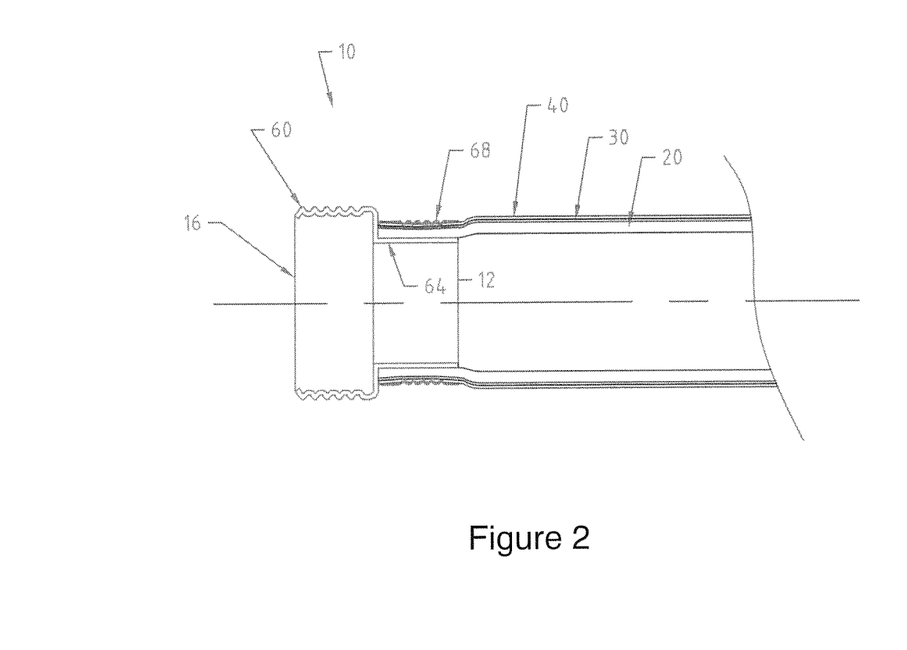
FIG. 2 is a partial, cross-sectional, longitudinal side view of one embodiment of a hose assembly of the present invention in an expanded position.

Referring now to the drawings, wherein like reference numbers refer to like parts throughout the several views, a hose assembly 10 is illustrated in FIGS. 1 and 2, wherein FIG. 1 illustrates the hose assembly in a contracted position and FIG. 2 an expanded position. Hose assembly 10 includes an inlet 14 and an outlet 16, with fluid passage 12 being located therebetween. The hose assembly includes an inner tube 20 that extends between couplers, see for example male coupler 60 and female coupler 70. The inner tube 20 is self-expanding and self-contracting. Inner tube 20 has an inner surface 22 and an outer surface 24, see FIGS. 1-3, for example. When a fluid, such as water when the hose assembly is utilized as a garden hose, is introduced into the inner tube 20 and exerts at least a minimum fluid pressure an inner surface 22, the inner tube 20 expands longitudinally between the couplers 60, 70 to an expanded position. When fluid pressure decreases below the minimum fluid pressure, the inner tube 20 relaxes or contracts. The inner tube 20 is formed from a material that can expand longitudinally to a length that is generally at least one and a half or two times, and desirably between two and four times and preferably at least four times the length of the inner tube 20 when in a relaxed or contracted position. Inner tube 20 additionally or alternatively also has the ability to expand radially outward in some embodiments when the minimum fluid pressure is achieved or exceeded. The radial expansion results in an increase in diameter and circumference of the inner tube 20.

The thickness of the inner tube 20 can vary depending upon the materials utilized to construct the same. In various embodiments, the thickness of the inner tube ranges generally from about 1.3 to about 2.5 mm, desirably from about 1.5 to about 2.2 mm, preferably from about 1.65 to about 1.90 mm, as measured in a radial direction in a contracted position.

Hose assembly 10 also includes a sheath or outer tube covering 40 that is also connected between first and second couplers, see for example male couplers 60 and female couplers 70. In one embodiment, the outer tube covering 40 is not connected or attached to the inner tube 20 or outer slip coating layer 30 between the couplers. Stated in another manner, the outer tube covering 40 is preferably unattached, unconnected, unbonded, and unsecured to either the inner tube 20 or slip coating layer 30 along the entire length of the inner tube 20 and slip coating layer 30 between the first end and the second end of the outer tuber covering 40, and thus the tube covering 40 is able to move freely with respect to the inner tube 20 and slip coating layer 30 when the hose assembly expands or contracts. In one embodiment, the radial expansion of inner tube 20 is limited by the dimensions, i.e. maximum, inner diameter, of outer tube covering 40. The outer tube covering 40 is configured to protect the inner tube 20 and slip coating layer 30, such as from cuts, friction, abrasion, puncture, over-expansion (bursting) or UV exposure. Outer tube covering 40 can be formed from any material, continuous or discontinuous, either elastic, or non-elastic, with non-elastic materials being preferred in one embodiment.

In various embodiments the outer tube covering 40 can be braided or woven. Non-woven fabrics are utilized in some embodiments. In additional embodiments, the outer tube is formed from a non-fabric material, such as a film, fiber-reinforced film, sheet or similar construction. Suitable materials include, but are not limited to, polyolefins, polyesters, and polyamides such as nylon. Polypropylene or polyester sheaths are preferred in some embodiments. Outer tube covering 40 should be formed from a material that is pliable and strong enough to withstand a desired internal pressure that can be exerted by outer surface 24 of inner tube 20. Thickness of the outer tube covering 40 is dependent on yarn denier used. This will be dictated by desired internal pressure as mentioned above.

In an important aspect of the present invention, slip coating layer 30 is provided on outer surface 24 of inner tube 20, see FIGS. 1-5. In a preferred embodiment, the slip coating layer 30 can be extruded onto or coextruded with the inner tube 20 layer. Other application methods would also be acceptable so long as the slip coating performs its intended function. It was unexpectedly found that the outer slip coating layer applied to the inner tube 20 provides the hose assembly with greater cycle life as compared to the inner tube 20 alone. Additionally, the slip coating layer 30 has been found to improve bite-through resistance as compared to the inner tube 20 alone, as it is a relatively hard material, as compared to the inner tube 20.

The slip coating layer 30 can be a continuous or discontinuous layer. In one preferred embodiment the slip coating layer is continuous, at least prior to a first expansion of inner tube 20 after the slip coating layer has been applied. Depending on the thickness of the slip coating layer 30 relatively thin layers, after one or more expansions of the inner tube 20, may exhibit cracking, splitting, crazing, fracturing or the like. Importantly though, such layers have still been found to be effective. That said, the initial thickness of the slip coating layer 30 ranges generally from about 0.025 mm to about 0.51 mm, desirably from about 0.05 to about 0.25 and preferably from about 0.10 to about 0.20 mm, or about 0.15 mm measured in a radial direction.

As illustrated in FIGS. 1-4, the slip coating layer 30 is located between the inner tube 20 and the outer tube covering 40. In a preferred embodiment, the slip coating layer is not directly connected to the outer tube covering 40 between the first coupler and the second coupler, e.g. male coupler 60 and female coupler 70, such that the outer tube covering 40 can slide or otherwise move in relation to the slip coating layer 30 during expansion and contraction of hose assembly 10. In an expanded position, the outer surface of the slip coating layer 30 is in contact with the inner surface of the outer tube covering 40.

As stated above, hose assembly 10 includes a male coupler 60 at a first end and a female coupler 70 at a second end. The male coupler 60 includes a threaded section 62 connected to a stem 64. In one embodiment, the stem 64 is inserted into the inner tube 20 which includes slip coating layer 30 on an outer surface thereof. In one embodiment, a portion of the outer tube covering 40 is located between slip coating layer 30 and a ferrule 68. The stem 64 and ferrule 68 are operatively connected by one or more of expansion of the stem 64 and compression of the ferrule 68 to secure the male coupler 60 to the inner tube 20 with slip coating layer 30 and outer tube covering 40.

In another embodiment the ferrule of coupler 60, 70 is in direct contact with the inner tube 20 and the outer tube covering 40 is contained between the outer diameter of the ferrule and the inner diameter of a compression nut of the coupler. In yet a further embodiment a ferrule or other piece of metal is formed around a stem. A machine is utilized to manipulate the ferrule and trap the inner tube with slip coating layer thereon and the outer covering between the ferrule and the stem. In a yet further embodiment, a fitting utilizing a stem attached to the coupling, a tapered ferrule and a compression nut are utilized. The compression nut contains a taper that mates with the tapered ferrule. As the compression nut is tightened, the ferrule is forced against the inner tube including the slip coating layer, outer tube covering and the coupling stem. In additional embodiments, other common fittings or hose end connections can be utilized and include, but are not limited to, crimped, barbed, or clamped couplings made from plastics, metals, or combinations thereof.

The female coupler 70 includes a threaded section 72 that is operatively and rotatably connected to a second end of the hose assembly 10 opposite the end containing male coupler 60. Threaded section 72 is constructed such that it can be operatively connected to a spigot, faucet, or other similar valve control device. The female coupler 70 can be connected to the other components of the hose assembly as mentioned hereinabove.

Figure 3:
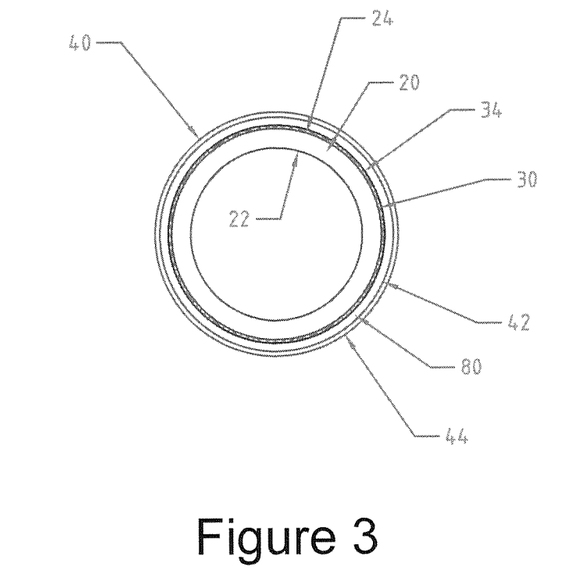
FIG. 3 is a partial, cross-sectional view of the hose assembly taken along line 3-3 in FIG. 1.
Figure 4:
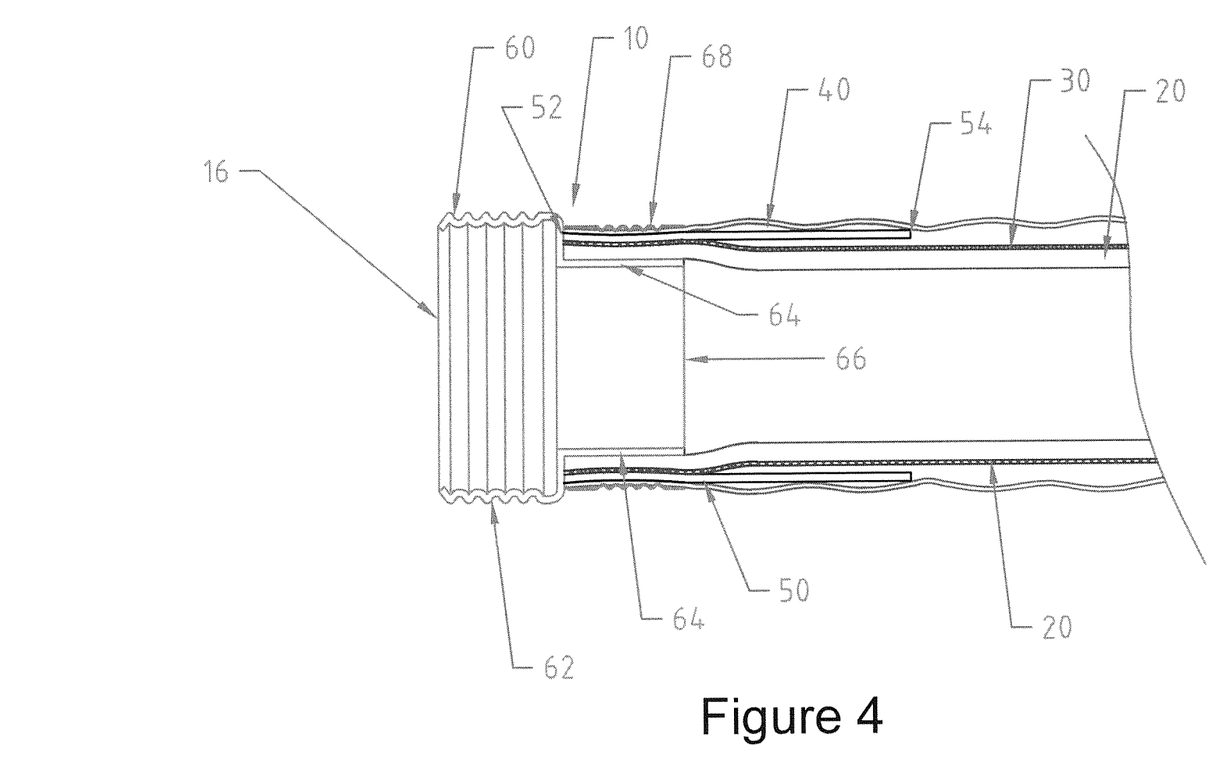
FIG. 4 is a partial, cross-sectional, longitudinal side view of one embodiment of a hose assembly of the present invention in a contracted position, wherein the hose assembly also includes a hose sleeve.

The hose assembly 10 is illustrated in a contracted position in FIGS. 1, 3 and 4. In this position, the elastic inner tube 20 is in a contracted or relaxed state with no internal force being applied to the inner surface 22 sufficient to expand or stretch inner tube 20. Depending on the material utilized for outer tube covering 40, space may exist between the same and the slip coating layer 30 and/or inner tube 20 when the hose assembly is in a contracted position, see FIG. 3 for example. FIG. 3 illustrates space 80 located between outer surface 34 of slip coating layer 30 and inner surface 42 of outer tube covering 40.

The fluid pressure within inner tube 20 can be increased for example by preventing fluid from being expelled through outlet 16, such as with the use of an associated nozzle or the like (not shown) and introducing fluid under pressure into the inlet 14 of hose assembly 10. Once a minimum threshold pressure is met or exceeded, the inner tube 20 undergoes expansion. Expansion of inner tube 20 generally results in an increase in the length of the inner tube as well as radial expansion, with the expansion decreasing the wall thickness of the inner tube increasing the diameter of the inner tube. Thus, a higher volume of fluid can be present in inner tube 20 in the expanded position as compared to the volume of fluid that can be present in a contracted position, below the minimum fluid pressure.

Depending upon the construction of the outer tube covering 40, in the expanded position, the covering may exhibit a relatively smooth, cylindrical character along its length, see FIG. 2 for example.

A further embodiment of the present invention is illustrated in FIG. 4 which illustrates a male end of hose assembly 10 including a sleeve 50 that functions as a strain relief device. Male coupler 60 includes a rigid insert member or stem 64 that is inserted into inner tube 20 and continues for a distance from the end of the inner tube, thereby creating a rigid section which does not bend. The vertical line illustrated in FIG. 4 represents the stem end 66 and indicates a junction between the area of the hose of the inner tube 20 that is made rigid by the stem 64 and the flexible inner tube 20 extending beyond the junction. As illustrated, the portion of the sleeve 50 that extends beyond stem end 66 is the strain distributor portion of the sleeves. The function of the sleeve 50 is to distribute bending forces over a relatively large area to prevent both localized material fatigue and a kinking of the inner tube 20. The slip coating layer 30 is present between the inner tube 20 and sleeve 50. The outer tube covering 40 surrounds sleeve 50, such as illustrated in FIG. 4.

The strain relieving sleeve 50 is generally a tube or hollow cylinder of material which generally increases the wall thickness of the inner tube 20 and slip coating layer 30 in the area where the sleeve is present. The sleeve may or may not be directly connected to the inner tube 20 or slip coating layer 30. When the sleeve is not fixedly connected to inner tube 20 having slip coating layer 30 thereon, the inner tube 20 and sleeve 50 are free to bend at slightly different radiuses. Bonding between the inner tube 20 or slip coating layer 30 and sleeve 50 may be desirable over some or all of the contact area between the components in order to give a controlled amount of flexing. In one embodiment, the sleeve 50 can be tapered from first end 52 to a second end 54 with the thickness being greater at first end 52. In this case, there is much less tendency to bend near a first end 52 of sleeve 50 than there is to bend at second end 54 of the sleeve 50 and tapering can be structured such as shown for inner tube 20 in FIG. 5. The tapered shown there is a simple wedge. However, other tapers may be utilized, such as an exponential curve, for example. As illustrated in AG. 4, the hose assembly construction including the sleeve 50 is connected or secured in the manner described above wherein inner tube 20, slip coating layer 30, sleeve 50 and outer tube covering 40 are fixed between the stem 64 and ferrule 68 of male coupler 60. In another embodiment, sleeve 50 is located outside of the outer tube covering 40. The sleeve 50 can be decorated with logos, names or other indicia.

The material utilized for sleeve 50 can be varied and can generally be any polymer, thermoplastic or thermosetting with non-limiting examples including, but not limited to, thermoplastic elastomers, polyolefins, polyesters, polyamides, natural rubbers, synthetic rubbers, polyurethanes and PVC. Regardless of the material selected, the sleeve 50 must have resilience and provide support for the inner tube 20 during flexing.

Figure 5:
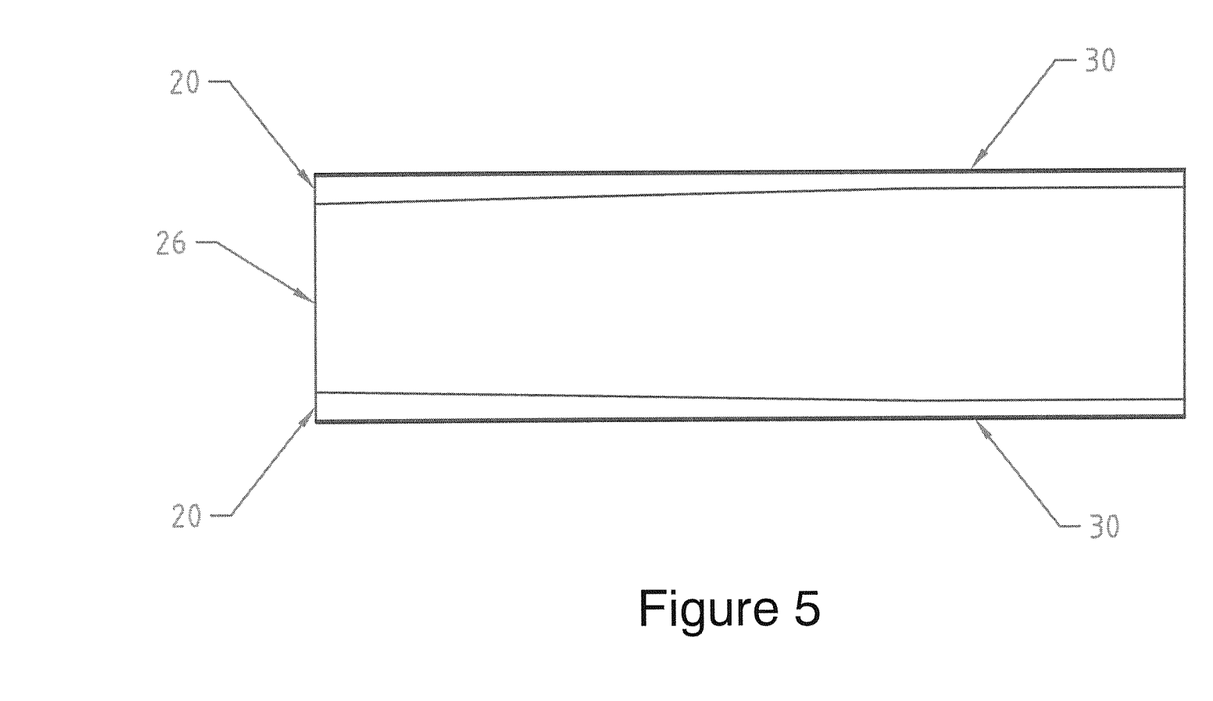
FIG. 5 is a partial, cross-sectional, longitudinal side view of one embodiment of a hose assembly of the present invention showing an inner tube having a greater thickness near the end of the tube that decreases to a lower thickness, with a graduated thickness particularly illustrated.

FIG. 5 shows a further embodiment of inner tube 20 and outer slip coating layer 30. Inner tube 20 is relatively thick at first end 26 and decreases in thickness moving in a longitudinal direction away from the first end, preferably to a constant thickness or substantially constant thickness at a distance from the end of the tube which is generally about 5-15 cm, desirably 6-12 cm and preferably 8-10 cm. The inner tube 20 tapering section can be formed during extrusion. The outer slip coating layer 30 is shown having a relatively constant thickness in FIG. 5.

Standard water pressure for water exiting a spigot from a municipal water system is about 45 to about 75 psi (310.3 to 517.1 kPa) and typically about 60 psi, 413.7 kPa. Such pressure is sufficiently above a minimum fluid pressure required for the hose to expand. That said, the minimum fluid pressure that causes the inner tube 20 of hose assembly 10 to expand in one embodiment is 42 psi (289.6 kPa) (initial) and 10 psi (68.9 kPa) for a second or subsequent expansion. When a nozzle or other flow restricting device is connected to the male coupler 60 of hose assembly 10, with the female coupler 70 being operatively connected to a spigot, the inner tube 20 will expand when the spigot valve is opened or turned on as water under pressure will flow into the hose. If the nozzle prevents the flow of fluid through the inner tube, the pressure inside the inner tube will achieve substantially the same pressure as that coming from the fluid pressure source, such as 60 psi (289.6 kPa) in the case of a standard municipal water supply. When fluid is released from the outlet 16 of hose assembly 10 through a suitable nozzle, the pressure inside the inner tube 20 is reduced. The hose assembly will remain in an expanded position when the fluid pressure remains above the minimum fluid pressure.

Inner tube 20 can be formed from any suitable elastic material. Suitable materials include, but are not limited to, rubbers including natural rubber, synthetic rubber and combinations thereof; and various thermoplastic elastomers including thermoplastic vulcanizates. Suitable thermoplastic elastomers include but are not limited to styrenic block copolymers, for example SEBS, SEEPS, and SBS; and SIS. In one embodiment the inner tube has a hardness that ranges from 20 to 60 Shore A, desirably from 25 to 60 Shore A, and preferably from 30 to 50 Shore A, as measured according to ASTM D-2240.

The inner tube compositions of the present invention may include additional additives including, but not limited to antioxidants, foam agent, pigments, heat stabilizers, UV absorber/stabilizer, processing aids, flow enhancing agents, nanoparticles, platelet fillers and non-platelet fillers.

The slip coating layer of the present invention comprises a lubricant, preferably incorporated into or blended with a carrier material. As described hereinabove, due to the relative low thickness of the slip coating layer, it has been unexpectedly found that the slip coating layer continues to function even though the layer may exhibit a discontinuous nature in one or more portions due to cracking or the like. Additionally, the slip coating layer has been found to provide benefits at the connection between the inner tube and coupler at least in the form of increased bite-through resistance.

The combination of the slip coating layer provided on the inner tube has been found to increase the durability of the hose assembly as evidenced by an increase in the number of cycles that the hose assembly can be expanded and contracted. A cycle is defined herein as an expansion of the hose assembly through application of fluid or air pressure at or above a minimum fluid or air pressure of at least 10 psi (68.9 kPa), followed by a contraction of the hose assembly to a contracted position. The hose assemblies of the present invention can withstand at least 500 expansion cycles, desirably at least 1000 expansion cycles and preferably at least 1500 expansion cycles utilizing the method described hereinabove.

Additionally, the slip coating layer is compounded to have a higher hardness (as measured according to ASTM D-2240) than the hardness of the inner tube. The slip coating layer hardness is at least 60 or 61 Shore A, preferably at least 70 Shore A, and most preferably at least 75 Shore A.

In one embodiment, the lubricant is a siloxane polymer or copolymer, or a fluorinated polymer or a combination thereof. A siloxane polymer masterbatch is available from Dow-Corning as MB50321™ and from Wacker as Genioplast™ Fluorinated polymer is available from McLube as MAC 1080™. The lubricant is present in the slip coating layer in an amount generally from about 1 to about 40 parts, desirably from about 2 to about 30 parts and preferably in an amount from about 3 to about 20 parts based on 100 total parts by weight of the slip coating layer.

As described herein, the lubricant is mixed with a carrier material that aids in affixing the lubricant on an outer surface of the inner tube. Suitable materials include, but are not limited to, thermoplastic polymers such as but not limited to polyolefins and polyurethanes, thermoplastic elastomers such as, but not limited to, the thermoplastic elastomers mentioned above for the inner tube layer, and thermoplastic vulcanizates or a combination thereof. In one embodiment, the carrier material comprises a polyolefin and one or more of the thermoplastic elastomers utilized in the inner tube layer.

Along with the carrier and lubricant, the slip coating layer may also include additional additives including, but not limited to, antioxidants, foaming agents, pigments, heat stabilizers, UV absorber/stabilizer, processing aids, flow enhancing agents, nanoparticles, platelet fillers and non-platelet fillers.

The lubricant has a low coefficient of friction. The coefficient of friction of the slip coat layer is less than 0.3, preferably less than 0.2 and most preferably less than 0.1 measured according to ASTM D1894.

EXAMPLES

The table below sets forth results from testing a commercially available hose assembly and a hose assembly of the present invention including a thermoplastic elastomer-based inner tube having a slip coating layer thereon. The slip coating layer had a thickness of 0.15 mm measured in a radial direction, with the slip coating layer being a siloxane polymer masterbatch available as MB50321™ from Dow-Corning. The tests were performed utilizing the expansion cycle testing procedure defined hereinabove and incorporated by reference. The fluid utilized was air.

| Example | Comparative Exp 1 | Example 1 |
| --- | --- | --- |
| Tube structure | Thermoset Latex Tube (X-hose) | TPE inner tube with slip coating layer |
| Expansion cycles before failure | <500 | 1564 |

As set forth in the table, the hose assembly of the present invention including a tube structure having a slip coating layer thereon had a greatly improved cycle life as compared to a commercially available hose assembly including a tube structure without a slip coating layer.

The invention further relates to the following:

1. A hose assembly, comprising: an inner tube comprising an elastomeric material; and a slip coating layer directly contacting the inner tube and comprising a lubricant and a carrier material, wherein the carrier comprises one or more of a thermoplastic polymer, thermoplastic vulcanizate and a thermoplastic elastomer, wherein the inner tube has one or more of a) a first length in a longitudinal direction in a contracted position below a minimum expansion pressure and a second length longer than the first length and b) a first radius in the contracted positon below the minimum expansion pressure a second radius larger than the first radius, when fluid pressure on an interior of the inner tube is at or above the minimum expansion pressure.

2. The hose assembly according to 1, wherein the slip coating layer has a higher hardness as measured according to ASTM D-2240 than a hardness of the inner tube.

3. The hose assembly according to 2, wherein the slip coating layer hardness is at least 61 Shore A.

4. The hose assembly according to 3, wherein the slip coating layer hardness is at least 70 Shore A.

5. The hose assembly according to any of 1 to 4, wherein the lubricant is present in the slip coating layer in an amount from 1 to 40 parts based on 100 total parts by weight of the slip coating layer.

6. The hose assembly according to any of 1 to 5, wherein the hose assembly further includes an outer covering, wherein the inner tube, slip coating layer, and outer covering each have a first end connected to a first coupler and a second end attached to a second coupler, wherein the outer covering is not attached to either the inner tube or the slip coating layer between the first and second coupler.

7. The hose assembly according to any one of 1 to 6, wherein the lubricant comprises one or more of a siloxane polymer, and fluorinated polymer.

8. The hose assembly according to any one of 1 to 7, wherein the slip coating layer is discontinuous after a first expansion of the inner tube above a pressure of 289.6 kPa.

9. The hose assembly according to any one of 1 to 8, wherein an initial thickness of the slip coating layer ranges generally from about 0.025 to about 0.51 mm, and wherein a thickness of the inner tube layer is from about 1.3 to about 2.5 mm.

10. The hose assembly according to any of one of 1 to 9, wherein the hose assembly can withstand at least 500 expansion cycles.

11. The hose assembly according to any one of 1 to 10, wherein the hose assembly can withstand at least 1000 expansion cycles.

12. The hose assembly according to any one of 1 to 11, wherein the hose assembly can withstand at least 1500 expansion cycles.

13. The hose assembly according to any of 1 to 12, wherein the lubricant comprises a siloxane polymer.

14. The hose assembly according to any one of 1 to 13, wherein the hose assembly further includes a sleeve fixed over at least one end of the inner tube and outer slip coating layer that extends along the inner tube a length from the end of the tube.

15. The hose assembly according to any one of 1 to 14, wherein the inner tube has a first end, wherein the inner tube has a radial thickness that is greater at the first end of the hose as compared to at least one adjacent segment located further away from the first end of the hose.

16. A hose assembly, comprising:
an inner tube comprising an elastomeric material that is expandable one or more of in length and radially to achieve an increase in tube diameter; a slip coating layer present on an outer surface of the inner tube, the slip coating layer comprising a lubricant and a carrier material, wherein the carrier comprises one or more of a thermoplastic polymer, thermoplastic vulcanizate and a thermoplastic elastomer; and an outer covering having a length that is greater than or equal to the length of the inner tube length in an expanded position, wherein the inner tube having the slip coating layer thereon is located within the outer covering, wherein the inner tube has a hardness that ranges from 20 to 60 Shore A measured according to ASTM D-2240, wherein the slip coating layer has a hardness that is at least 61 Shore A, and wherein the lubricant is present in the slip coating layer in an amount from 1 to 40 parts based on 100 total parts by weight of the slip coating layer.

17. The hose assembly according to 16, wherein the slip coating layer is discontinuous after a first expansion of the inner tube above a pressure of 289.6 kPa.

18. The hose assembly according to 17, wherein the slip coating layer hardness sis at least 70 Shore A.

19. The hose assembly according to 18, wherein the lubricant is present in the slip coating layer in an amount from 1 to 40 parts based on 100 total parts by weight of the slip coating layer.

20. The hose assembly according to 19, wherein the lubricant comprises a siloxane polymer.

While in accordance with the patent statutes the best mode and preferred embodiment have been set forth, the scope of the invention is not limited thereto, but rather by the scope of the attached claims.

What is claimed is:

1. A hose assembly, comprising:
an inner tube comprising an elastomeric material; and
a slip coating layer directly contacting the inner tube and comprising a lubricant and a carrier material, wherein the carrier comprises one or more of a thermoplastic polymer, thermoplastic vulcanizate and a thermoplastic elastomer, wherein the inner tube has one or more of a) a first length in a longitudinal direction in a contracted position below a minimum expansion pressure and a second length longer than the first length and b) a first radius in the contracted position below the minimum expansion pressure a second radius larger than the first radius, when fluid pressure on an interior of the inner tube is at or above the minimum expansion pressure, and wherein the slip coating layer is discontinuous after a first expansion of the inner tube above a pressure of 289.6 kPa.

2. The hose assembly according to claim 1, wherein the slip coating layer has a higher hardness as measured according to ASTM D-2240 than a hardness of the inner tube.

3. The hose assembly according to claim 2, wherein the slip coating layer hardness is at least 61 Shore A.

4. The hose assembly according to claim 3, wherein the slip coating layer hardness is at least 70 Shore A.

5. The hose assembly according to claim 4, wherein the lubricant is present in the slip coating layer in an amount from 1 to 40 parts based on 100 total parts by weight of the slip coating layer.

6. The hose assembly according to claim 5, wherein the hose assembly further includes an outer covering, wherein the inner tube, slip coating layer, and outer covering each have a first end connected to a first coupler and a second end attached to a second coupler, wherein the outer covering is not attached to either the inner tube or the slip coating layer between the first and second coupler.

7. The hose assembly according to claim 5, wherein the lubricant comprises one or more of a siloxane polymer, and fluorinated polymer.

8. The hose assembly according to claim 1, wherein an initial thickness of the slip coating layer ranges from 0.025 to 0.51 mm, and wherein a thickness of the inner tube layer is from 1.3 to 2.5 mm.

9. The hose assembly according to claim 1, wherein the hose assembly can withstand at least 500 expansion cycles.

10. The hose assembly according to claim 9, wherein the hose assembly can withstand at least 1000 expansion cycles.

11. The hose assembly according to claim 10, wherein the hose assembly can withstand at least 1500 expansion cycles.

12. The hose assembly according to claim 7, wherein the lubricant comprises a siloxane polymer.

13. The hose assembly according to claim 1, wherein the hose assembly further includes a sleeve fixed over at least one end of the inner tube and outer slip coating layer that extends along the inner tube a length from the end of the tube.

14. The hose assembly according to claim 1, wherein the inner tube has a first end, wherein the inner tube has a radial thickness that is greater at the first end of the hose as compared to at least one adjacent segment located further away from the first end of the hose.

15. A hose assembly, comprising:
an inner tube comprising an elastomeric material that is expandable one or more of in length and radially to achieve an increase in tube diameter; and
a slip coating layer present on an outer surface of the inner tube, the slip coating layer comprising a lubricant and a carrier material, wherein the carrier comprises one or more of a thermoplastic polymer, thermoplastic vulcanizate and a thermoplastic elastomer; and an outer covering having a length that is greater than or equal to the length of the inner tube length in an expanded position, wherein the inner tube having the slip coating layer thereon is located within the outer covering, wherein the inner tube has a hardness that ranges from 20 to 60 Shore A measured according to ASTM D-2240, wherein the slip coating layer has a hardness that is at least 61 Shore A, and wherein the lubricant is present in the slip coating layer in an amount from 1 to 40 parts based on 100 total parts by weight of the slip coating layer, wherein the slip coating layer is discontinuous after a first expansion of the inner tube above a pressure of 289.6 kPa.

16. The hose assembly according to claim 15, wherein the slip coating layer hardness is at least 70 Shore A.

17. The hose assembly according to claim 16, wherein the lubricant is present in the slip coating layer in an amount from 1 to 40 parts based on 100 total parts by weight of the slip coating layer.

18. The hose assembly according to claim 17, wherein the lubricant comprises a siloxane polymer.

* * * * *